(12) United States Patent
Tsuie

(10) Patent No.: US 7,433,296 B2
(45) Date of Patent: Oct. 7, 2008

(54) MODE DETECTION FOR OFDM SIGNALS

(75) Inventor: Yih-Ming Tsuie, Hsinchu (TW)

(73) Assignee: Silicon Integrated Systems Corp., Hsinchu (TW)

( * ) Notice: Subject to any disclaimer, the term of this patent is extended or adjusted under 35 U.S.C. 154(b) by 1224 days.

(21) Appl. No.: 10/447,154

(22) Filed: May 29, 2003

(65) Prior Publication Data

US 2004/0240379 A1  Dec. 2, 2004

(51) Int. Cl.
*H04J 11/00* (2006.01)
(52) U.S. Cl. .................. 370/203; 370/210
(58) Field of Classification Search ......... 370/204–211, 370/203; 708/422–426
See application file for complete search history.

(56) References Cited

U.S. PATENT DOCUMENTS 6,074,086 A * 6/2000 Yonge, III ............ 708/422
6,137,847 A * 10/2000 Stott et al. ............ 375/344
6,359,938 B1 * 3/2002 Keevill et al. ........... 375/316

* cited by examiner

*Primary Examiner*—Huy D. Vu
*Assistant Examiner*—Alex Skripnikov
(74) *Attorney, Agent, or Firm*—Muncy, Geissler, Olds, & Lowe PLLC

(57) ABSTRACT

A method and apparatus for detecting the transmitted mode and guard interval length. The mode detection is adopted by the DVB-T system to increase system flexibility and combat multi-path interference in the transmission environment, of the received OFDM signals by applying the concepts of down-sampling and correlation. The unique combination of down-sampling and correlation method requires far less memory than the traditional correlation methods. By comparing the indicators resulting from output of each correlation module, the transmitted mode and guard interval length are detected with much greater reliability.

24 Claims, 6 Drawing Sheets

MODE DETECTION FOR OFDM SIGNALS

BACKGROUND OF THE INVENTION

1. Field of the Invention

The present invention relates to an OFDM receiver and particularly to a method of mode detection for OFDM signals in a DVB-T receiver.

2. Description of the Prior Art

OFDM is a multi-channel modulation system employing Frequency Division Multiplexing (FDM) of orthogonal sub-carriers, each modulated by a low bit-rate digital stream.

In older multi-channel systems using FDM, the total available bandwidth is divided into N non-overlapping frequency sub-channels. Each sub-channel is modulated with a separate symbol stream and the N sub-channels are frequency multiplexed. Even though the prevention of spectral overlapping of sub-carriers reduces (or eliminates) Inter-channel Interference, this leads to an inefficient use of spectrum. The guard bands on either side of each sub-channel waste bandwidth. To overcome the problem of bandwidth wastage, alternatively N overlapping (but orthogonal) sub-carriers, each carrying a baud rate of 1/T and spaced 1/T apart can be used. The sub-carriers are all mathematically orthogonal to each other because of the frequency spacing selected. This permits the proper demodulation of the symbol streams without requiring non-overlapping spectra. Another way of specifying the sub-carrier orthogonality is to require that each sub-carrier have an exact integer number of cycles in the interval T. The modulation of these orthogonal sub-carriers can be represented as an Inverse Fourier Transform. Alternatively, a DFT operation followed by low-pass filtering can generate the OFDM signal. It must be noted that OFDM can be used either as a modulation or multiplexing technique.

The use of Discrete Fourier Transform (DFT) in the parallel transmission of data using Frequency Division Multiplexing was investigated in 1971 by Weinstein and Ebert. In a data sequence $d_0, d_2, \ldots, d_{N-1}$, where each $d_n$ is a complex symbol (the data sequence can be the output of a complex digital modulator, such as QAM, PSK etc), when performing an IDFT on the sequence 2 dn (the factor 2 is used purely for scaling purposes), N complex numbers Sm (m=0,1..., N−1) result, as:

$$S_m = 2\sum_{n=0}^{N-1} d_n \exp\left(j2\pi\frac{nm}{N}\right) \quad (2.1)$$

$$= 2\sum_{n=0}^{N-1} d_n \exp(j2\pi f_n t_m) \quad [m = 0, 1, \ldots N-1]$$

where, $$f_n = \frac{n}{NT_s} \text{ and } t = mT_s \quad (2.2)$$

Where, $T_s$ represents the symbol interval of the original symbols. Passing the real part of the symbol sequence represented by equation (2.1) thorough a low-pass filter with each symbol separated by a duration of $T_s$ seconds, yields the signal, $$y(t) = 2\text{Re}\left\{\sum_{n=0}^{N-1} d_n \exp\left(j2\pi\frac{n}{T}t\right)\right\}, \text{ for } 0 \leq t \leq T \quad (2.3)$$

Where T is defined as $NT_s$. The signal y(represents the baseband version of the OFDM signal.

It can be noted from (2.3) that the length of the OFDM signal is T, the spacing between the carriers is equal to 1/T, the OFDM symbol-rate is N times the original baud rate, there are N orthogonal sub-carriers in the system, and the signal defined in equation (2.3) is the basic OFDM symbol.

One of the group main advantages of OFDM is its effectiveness against the multi-path delay spread frequently encountered in mobile communication channels. The reduction of the symbol rate by N times results in a proportional reduction of the relative multi-path delay spread, relative to the symbol time. To completely eliminate even the very small ISI that results, a guard time is introduced for each OFDM symbol. The guard time chosen must be larger than the expected delay spread, such that multi-path components from one symbol cannot interfere with the next symbol. Leaving the guard time empty may lead to inter-carrier interference (ICI), since the carriers are no longer orthogonal to each other. To avoid such crosstalk between sub-carriers, the OFDM symbol is cyclically extended in the guard time. This ensures that the delayed replicas of the OFDM symbols always have an integer number of cycles within the FFT interval as long as the multi-path delay spread is less than the guard time.

If the ODFM symbol is generated using equation (2.3), the power spectral density of this signal is similar to that shown in FIG. 1. The sharp-phase transitions caused by phase modulation result in very large side-lobes in the PSD and slow spectrum roll-off (according to a sinc function). If the number of sub-carriers increases, the spectrum roll-off is sharp in the beginning, but degrades further at frequencies further away from the 3-dB cut-off frequency. To overcome the slow spectrum roll-off problem, windowing may be used to reduce the side-lobe level. The most commonly used window is the Raised Cosine Window given by:

$$w(t) = \begin{cases} 0.5 + 0.5\cos(\pi + \pi t/(\beta T_r)), & 0 \leq t \leq \beta T_r \\ 1.0, & \beta T_s \leq t \leq T_r \\ 0.5 + 0.5\cos((t - T_r)\pi/\beta T_r), & T_s \leq t \leq (1+\beta)T_r \end{cases}$$

Here $T_r$ is the symbol interval chosen to be shorter than the actual OFDM symbol duration, since the symbols are allowed to partially overlap in the roll-off region of the raised cosine window. Incorporating the windowing effect, the OFDM symbol can now be represented as:

$$y(t) = 2\text{Re}\left\{w(t)\sum_{n=0}^{N-1} d_n \exp\left(j2\pi\frac{n}{T}t\right)\right\}, \text{ for } 0 \leq t \leq T$$

It must be noted that filtering can also be used as a substitute for windowing, for tailoring the spectrum roll-off. Windowing, though, is preferred to filtering because it can be carefully controlled. With filtering, rippling effects in the roll-off region of the OFDM symbol must be avoided. Rippling causes distortions in the OFDM symbol, which directly leads to lower tolerance of display spread?

Based on the previous discussion, the method for generating an ODFM symbol is as follows.

First, the N input complex symbols are padded with zeros to get $N_s$ symbols to calculate the IFFT. The output of the IFFT is the basic OFDM symbol.

Based on the delay spread of the multi-path channel, a specific guard-time must be chosen (e.g. $T_g$). A number of samples corresponding to this guard time must be taken from the beginning of the OFDM symbol and appended to the end of the symbol. Likewise, the same number of samples must be taken from the end of the OFDM symbol and inserted at the beginning.

The OFDM symbol must be multiplied by the raised cosine window to remove the power of the out-of-band sub-carriers.

The windowed OFDM symbol is then added to the output of the previous OFDM symbol with a delay of $T_r$, so that there is an overlapping region of $\beta T_r$ between each symbol.

OFDM system design, as with any other system design, involves tradeoffs and conflicting requirements. The following are the most important design parameters of an OFDM system and may form part of a general OFDM system specification. Bit Rate required for the system, available bandwidth, BER requirements (power efficiency) and RMS delay spread of the channel.

Guard Time

Guard time in an OFDM system usually results in an SNR loss in an OFDM system, as it carries no information. The choice of the guard time is straightforward once the multipath delay spread is known. In general practice, the guard time must be at least 2-4 times the RMS delay spread of the multi-path channel. Further, higher-order modulation schemes (like 32 or 64 QAM) are more sensitive to ISI and ICI than simple schemes like QPSK. This factor must also be taken into account when determining the guard-time.

Symbol Duration

To minimize SNR loss due to guard time, symbol duration must be set much higher than guard time. An increase in symbol time, however, implies a corresponding increase in the number of sub-carriers and thus an increase in the system complexity. A practical design choice for symbol time requires at least five times the guard time, which yields acceptable SNR loss.

Number of Sub-carriers

Once the symbol duration is determined, the number of sub-carriers required can be determined by first calculating the sub-carrier spacing by simply inverting the symbol time (less the guard period). The number of sub-carriers is the available bandwidth divided by the sub-carrier spacing.

Modulation and Coding Choices

The first step in selecting coding and modulation techniques is to determine the number of bits carried by an OFDM symbol. A suitable combination of modulation and coding techniques can then be selected to fit the input data rate into the OFDM symbols and, simultaneously satisfy the bit-error rate requirements. Selection of modulation and coding techniques is simplified, as each channel is assumed to be almost AWGN and there is no requirement for consideration of the effects of multi-path delay spread.

OFDM possesses inherent advantages for wireless communications.

As discussed earlier, the increase in the symbol time of the OFDM symbol by N times (N being the number of sub-carriers), leads to a corresponding increase in the effectiveness of OFDM against the ISI caused due to multi-path delay spread. Further, use of the cyclic extension process and proper design can completely eliminate ISI from the system.

In addition to delay variations in the channel, the lack of amplitude flatness in the frequency response of the channel also causes ISI in digital communication systems. A typical example would be use of twisted-pair cable in telephone lines. These transmission lines are designed for voice calls and offer poor frequency response in high frequency transmission. In systems that use single-carrier transmission, an equalizer may be required to mitigate the effect of channel distortion. The complexity of the equalizer depends upon the severity of the channel distortion and there are frequently issues such as equalizer non-linearities and error propagation etc. that present additional obstacles.

In OFDM systems, on the other hand, since the bandwidth occupied by each sub-carrier is very small, the amplitude response over such narrow bandwidth will be basically flat (it can be safely assumed that the phase response will be linear over said narrow bandwidth). In the case of extreme amplitude distortion, an equalizer of very simple structure will be sufficient to correct distortion in each sub-carrier.

The use of sub-carrier modulation improves the flexibility of OFDM to combat channel fading and distortion, and makes it possible for the system to transmit at maximum possible capacity using the technique of channel loading. If the transmission channel has a fading notch in a certain frequency range corresponding to a certain sub-carrier, the presence of this notch can be detected using channel estimation schemes, and assuming that the notch does not vary rapidly enough compared to the symbol duration of the OFDM symbol, it is possible to change (scale down/up) the modulation and coding schemes for this particular sub-carrier (i.e., increase their robustness against noise), so that overall sub-carrier capacity is maximized. This however requires data from channel-estimation algorithms. In the case of single-carrier systems, no remedy exists for preventing such fading notches. The data must somehow survive the distortion using error correction coding or equalizers.

Impulse noise usually comprises a burst of interference in channels such as the return path HFC (Hybrid-Fiber-Coaxial), twisted-pair and wireless channels caused by lightning or other atmospheric phenomena. It is common for the length of the interference waveform to exceed the symbol duration of a typical digital communication system. For example, in a 10 MBPS system, the symbol duration is 0.1 µs, and an impulse noise waveform, of about two micro-seconds, can cause a burst of errors that cannot be corrected using normal error-correction coding. Usually complicated Reed-Solomon codes in conjunction with huge interleaves are used to correct this problem. OFDM systems are inherently robust against impulse noise, since the symbol duration of an OFDM signal is much longer than that of the corresponding single-carrier system and thus, it is less likely that impulse noise will cause (even single) symbol errors. Thus, complicated error-control coding and interleaving schemes for handling burst-type errors are not required for OFDM systems, thus simplifying transceiver design.

OFDM is the best environment in which to employ frequency diversity. In fact, in a combination of OFDM and CDMA, called MC-CDMA transmission, frequency diversity is inherently present in the system (i.e., it is freely available). Although OFDM provides advantages for wireless transmission, it also has some serious disadvantages that must be overcome for this technology to succeed.

Many applications that use OFDM technology have arisen in the last few years. In the following, one such application is described in detail.

Digital Video Broadcasting (DVB) is a standard for broadcasting Digital Television over satellite, cable, and terrestrial (wireless) transmission.

Approved by the DVB Steering Board in December 1995, DVB-T is the system specification for the terrestrial broadcast of digital television signals. This work was based on a set of user requirements produced by the Terrestrial Commercial Module of the DVB project. DVB members contributed to the technical development of DVB-T through the DTTV-SA (Digital Terrestrial Television-Systems Aspects) of the Technical Module. The European Projects SPECTRE, STERNE, HD-DIVINE, HDTVT, dTTb, and several other organizations developed system hardware and produced test results that were fed back to DTTV-SA.

As with the other DVB standards, MPEG-2 audio and video encoding forms the transmitted data of DVB-T. Other elements of the specification include a transmission scheme based on orthogonal frequency-division multiplexing (OFDM), which allows for the use of either 1705 carriers (usually known as 2 k), or 6817 carriers (8 k). Concatenated error correction is used. The 2 k mode is suitable for single-transmitter operation and for relatively small single-frequency networks with limited transmitter power. The 8 k mode can be used both for single-transmitter operation and for large-area single-frequency networks. The guard interval is selectable. As well, Reed-Solomon outer coding and outer convolutional interleaving are used, as with the other DVB standards, and another error-correction system, using a punctured convolutional code, is added. The amount of overhead required by the inner code of the second error-correction system, can be adjusted to suit the needs of the service provider. The data carriers in the coded orthogonal frequency-division multiplexing (COFDM) frame can use QPSK and different levels of QAM modulation and code rates to trade bits for enhanced robustness. Bi-level hierarchical channel coding and modulation can be used, but hierarchical source coding is not used. The latter was deemed unnecessary by the DVB group because its benefits did not justify the extra receiver complexity. Finally, the modulation system combines OFDM with QPSK/QAM. OFDM uses a large number of carriers that spread the information content of the signal. Used successfully in DAB (digital audio broadcasting), the major advantage of OFDM is resistance to multi-path interference.

Improved immunity to multi-path interference is obtained through the use of a guard interval, a portion of the digital signal given away for echo resistance. This guard interval reduces the transmission capacity of OFDM systems. However, the greater the number of OFDM carriers provided, for a given maximum echo time delay, the less transmission capacity is lost. Nonetheless, a tradeoff is involved. Simply increasing the number of carriers has a significantly detrimental impact on receiver complexity and phase-noise sensitivity.

Because of the multi-path immunity of OFDM, it may be possible to operate an overlapping network of transmitting stations with a single frequency. In the areas of overlap, the weaker of the two received signals is similar to an echo signal. However, if the two transmitters are far apart, causing a large time delay between the two signals, the system will require a large guard interval.

The potential exists for three different operating environments for digital terrestrial television in Europe, including broadcast on a currently unused channel, such as an adjacent channel, or on a clear channel; broadcast in a small-area single-frequency network (SFN); or broadcast in a large-area SFN.

One of the group main challenges for the DVB-T developers is that the different operating environments lead to somewhat different optimum OFDM systems. The common 2 k/8 k specification has been developed to offer solutions for all (or nearly all) operating environments.

It should be noted that, in the DVB-T system, the ratio of guard interval Tg over the desired symbol interval Tu may be $\frac{1}{32}$, $\frac{1}{16}$, $\frac{1}{8}$ and $\frac{1}{4}$, and Tu is respectively 2048 and 8192 in the 2K-mode and 8K-mode transmission. Thus, in order to recover the original information carried in an OFDM signal received from an OFDM transmitter, the values of Tu and Tg must be known before implementing guard interval removal and discrete Fourier transformation. A mode detection mechanism is thus required in the DVB-T receiver.

In U.S. Pat. No. 6,330,293, Otto Klank et al. disclose a mode detection method. At the receiver end, coarse time synchronization linked to mode detection and, possibly and additionally, coarse AFC (automatic frequency correction) are carried out initially both for seeking and identifying received signals, as well as for continuously monitoring them. The time signal is correlated with the time signal shifted by the desired symbol length Tu. This correlation may be carried out more than once, for example five times per data frame. In this correlation, signal samples of different length Tu are used, depending on the respective mode, and the maximum correlation result obtained from this are then used to deduce the present mode (for example 2K or 8K modes). If no usable correlation result maximum is obtained, the correlation steps may be repeated.

FIG. 2 is a diagram showing a mode detector disclosed in U.S. patent application publication No. 2002/0186791. The I and Q samples of the received signal are supplied to an input terminal 10. The samples are supplied to a 2 k and 8 k size first-in first-out (FIFO) memory 121 and 122. The moving average correlation of the samples over a minimum guard period is then calculated in blocks 141 and 142, and the power of the correlation measured in blocks 161 and 162. The correlation function is calculated in blocks 141 and 142 by multiplying input symbols with symbols contemporaneously obtained from the delay blocks 121 and 122 with the delay applied thereto, thereby obtaining a measure of the correlation between them. The results are then summed, and a running average is calculated over a number of samples, equal to the smallest allowed guard interval size, that is, {fraction ($\frac{1}{32}$)} of the FFT size. Thus, for example, g=64 and 256 samples in 2 k and 8 k mode respectively. Each combination of the blocks 141 and 161, and 142 and 162 therefore forms a correlation function, and the separation between peaks in each correlation function depends on the total duration of the symbol plus the guard period. The resulting measurements are passed to blocks 181 and 182 for decimation (i.e., removal of some portion of the samples). The samples remaining after decimation in blocks 181 and 182 are then passed through filtering resonators 191-198, each centered at a respective resonance frequency based on the COFDM symbol frequency of a particular combination of the mode and the guard interval. A counter (not shown) is provided at the output of each of the resonators 191-198, and each counter increments when its peak power is largest. The peak power produced by each resonator is then compared. Thus, by examining the counter values after a number of symbols, the counter with the highest value is determined to be that which corresponds to the mode (either 2 k or 8 k) and guard period used by the transmitted signal.

However, the mode detection using only correlation result maxima or power peak is susceptible to noise. Multi-path propagation reduces the correlation result maxima or power peak, and makes it indistinct. Thus, no usable correlation result maxima or power peak will be obtained or detected if the RF signal is received through multi-path propagation. Further, the correlation operation requires a large memory to temporarily store the symbols of the OFDM signal.

SUMMARY OF THE INVENTION

The object of the present invention is to provide an efficient mode detection method and apparatus requiring less memory.

The present invention provides a method for processing a RF OFDM signal transmitted from an OFDM transmitter. The method comprises the steps of receiving and converting the RF OFDM signal into an IF OFDM signal, converting the IF OFDM signal into a digital OFDM signal composed of an original sample sequence, detecting a transmission mode and guard interval length of the OFDM signal, implementing digital processing of the OFDM signal in time domain and frequency domain, and implementing channel decoding and de-interleaving of the OFDM signal, wherein the mode detection comprises the steps of down-sampling the original sample sequence by first, second, third and fourth factors to generate first, second, third and fourth down-sampled sequence, delaying the original sample sequence by a first and second number of samples, and down-sampling the delayed sample sequences by the third factor to generate a fifth and sixth down-sampled sequence, applying a first, second and third correlation function to the first, second and fourth down-sampled sequence, and a fourth correlation function to the third, fifth and sixth down-sampled sequence, to derive a first, second, third, fourth, fifth and sixth correlation powers respectively, down-sampling the original sample sequence by a fifth, sixth, seventh and eighth factor to generate a seventh, eighth, ninth and tenth down-sampled sequence, delaying the original sample sequence by a third and fourth number of samples, and down-sampling the delayed sample sequences by the seventh factor to generate a eleventh and twelfth down-sampled sequence, applying the first, second and third correlation function to the seventh, eighth and ninth down-sampled sequence, and the fourth correlation function to the tenth, eleventh and twelfth down-sampled sequence, to derive a seventh, eighth, ninth, tenth, eleventh and twelfth correlation powers respectively, and determining the transmission mode and guard interval length by the first, second, third, seventh, eighth and ninth correlation powers, the maximum of the fourth, fifth and sixth correlation powers, and the maximum of the tenth, eleventh and twelfth correlation powers.

The present invention further provides an OFDM receiver comprising a front end receiving and converting the RF OFDM signal into an IF OFDM signal, an A/D converter converting the IF OFDM signal into a digital OFDM signal, a mode detector detecting a transmission mode and guard interval length of the digital OFDM signal by the steps of down-sampling the original sample sequence by a first, second, third and fourth factors to generate a first, second, third and fourth down-sampled sequence, delaying the original sample sequence by a first and second number of samples, and down-sampling the delayed sample sequences by the third factor to generate a fifth and sixth down-sampled sequence, applying a first, second and third correlation function to the first, second and fourth down-sampled sequence, and a fourth correlation function to the third, fifth and sixth down-sampled sequence, to derive a first, second, third, fourth, fifth and sixth correlation powers respectively, down-sampling the original sample sequence by a fifth, sixth, seventh and eighth factor to generate a seventh, eighth, ninth and tenth down-sampled sequence, delaying the original sample sequence by a third and fourth number of samples, and down-sampling the delayed sample sequences by the seventh factor to generate a eleventh and twelfth down-sampled sequence, applying the first, second and third correlation function to the seventh, eighth and ninth down-sampled sequence, and the fourth correlation function to the tenth, eleventh and twelfth down-sampled sequence, to derive a seventh, eighth, ninth, tenth, eleventh and twelfth correlation powers respectively, and determining the transmission mode and guard interval length by the first, second, third, seventh, eighth and ninth correlation powers, the maximum of the fourth, fifth and sixth correlation powers, and the maximum of the tenth, eleventh and twelfth correlation powers, frequency and time domain digital processors implementing digital processing of the OFDM signal in time domain and frequency domain, and a channel decoder and de-interleaver implementing channel decoding and de-interleaving of the OFDM signal.

BRIEF DESCRIPTION OF THE DRAWINGS

The present invention will become more fully understood from the detailed description given hereinbelow and the accompanying drawings, given by way of illustration only and thus not intended to be limitative of the present invention.

DETAILED DESCRIPTION OF THE INVENTION

Figure 1:
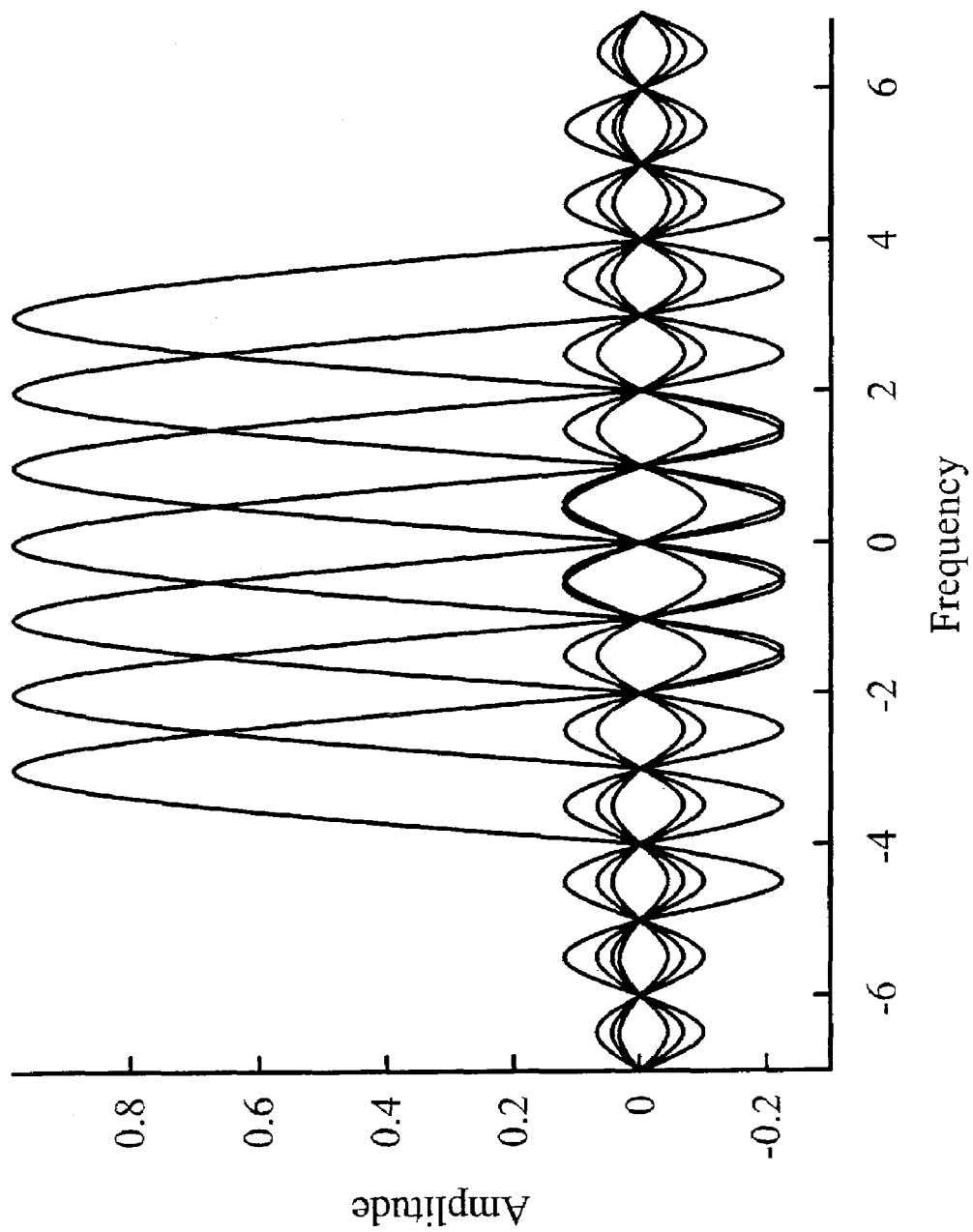
FIG. 1 is a diagram showing power spectral density of the OFDM signal.
Figure 2:
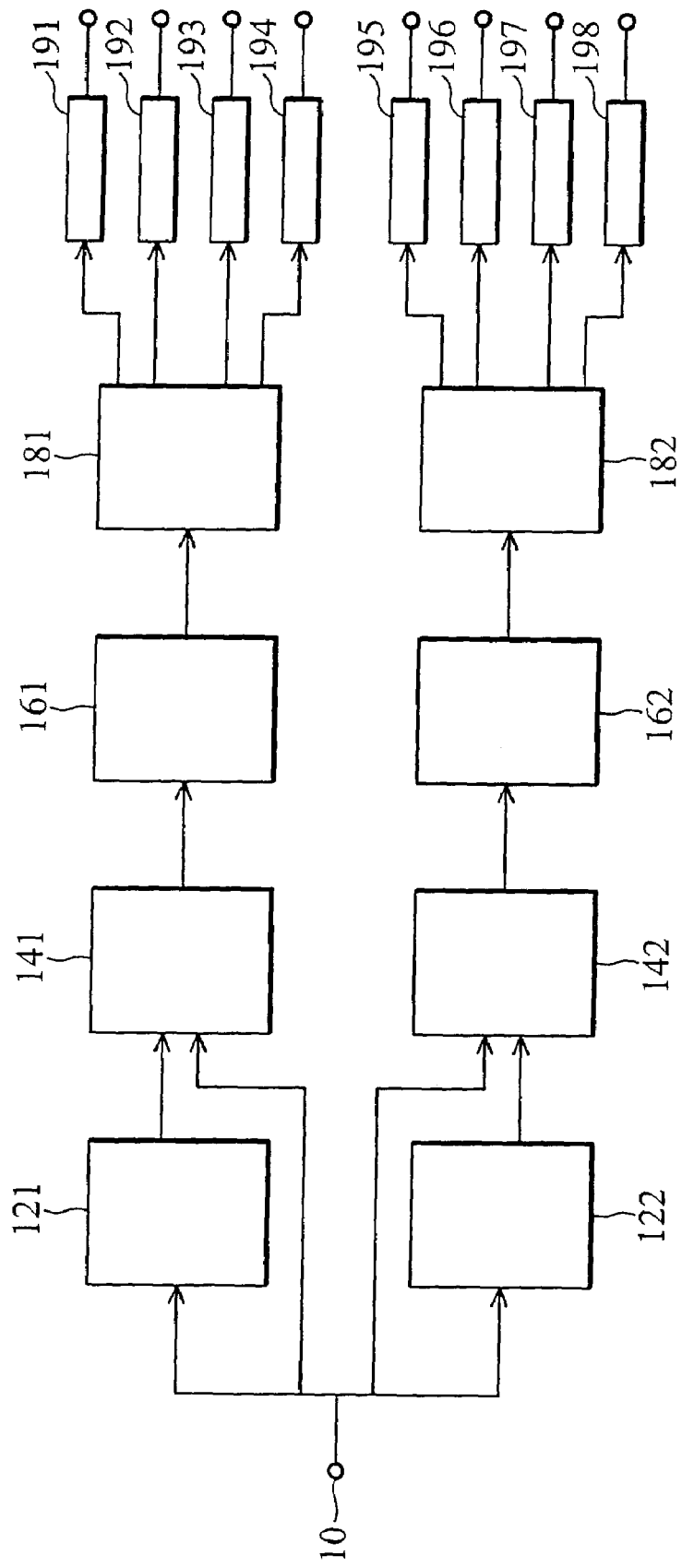
FIG. 2 is a diagram showing a conventional mode detector.
Figure 3:
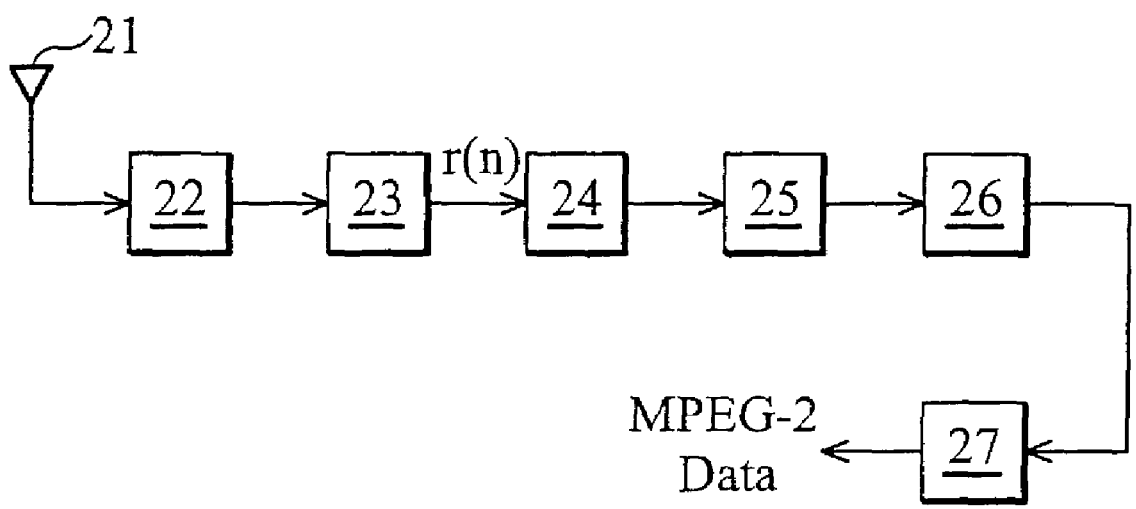
FIG. 3 is a functional block diagram of an OFDM receiver according to one embodiment of the invention.

FIG. 3 is a functional block diagram of an OFDM receiver according to one embodiment of the invention. The OFDM receiver 2 includes an antenna 21, a front end 22, A/D converter 23, mode detector 24, time-domain digital signal processor 25, frequency-domain digital signal processor 26 and channel decoder and de-inter-leaver 27.

The antenna 21 receives a radio frequency (RF) signal from an OFDM transmitter (not shown). The RF signal received by the antenna 21 is an OFDM modulated signal carrying OFDM symbols. The OFDM receiver 2 performs a receiving process for the OFDM symbols.

The front end 22 typically includes an RF tuner converting the received RF signal in frequency to an intermediate frequency band (IF) signal, amplifying it, and transmitting it to the A/D converter 23.

The digital signal r(n) from the A/D converter 23 is sent to the mode detector 24 for detection of the transmission mode of the OFDM signal. The mode detector 24 will be described in detail later.

After mode detection, the digital OFDM signal is sent to the time-domain digital processor 25 and then to the frequency-domain digital processor 26. Through the time and frequency domain processor 25 and 26, the OFDM signal is mixed down to a baseband signal, synchronized, with cyclic prefix removed. FFT is then applied to the signal and the channels are estimated and equalized. The cyclic prefix removal, synchronization and channel estimation are explained in the following.

The cyclic prefix in the OFDM signal is removed before implementation of FFT. The cyclic prefix is used to completely eliminate the inter-symbolic interference. A guard time larger than the expected delay spread is chosen such that multi-path components from one symbol cannot interfere with the next symbol, wherein the cyclic prefix is located. The guard time may not be a signal, in such case the problem of inter-carrier interference (ICI) arises. The OFDM symbol is then cyclically extended during the guard time. Using this method, the delay replicas of the OFDM symbol always have an integer number of cycles within the FFT interval, as long as the delay is smaller than the guard time. Multi-path signals with delays smaller than the guard time cannot cause ISI.

Synchronization a major obstacle in achieving OFDM, is usually complicated by several factors which include the following. Frame detection, carrier frequency offset estimation and correction, sampling error correction.

Frame detection determines the symbol boundary so that correct samples for a symbol frame can be taken. Due to the carrier frequency difference between the transmitter and receiver, each signal sample at time t contains an unknown phase factor $\Delta fcT$ where $\Delta fc$ is the unknown carrier frequency offset. This unknown phase factor must be estimated and compensated for each sample before implementing FFT at the receiver, otherwise the orthogonality between sub-carriers lost. For example, when the carrier is at 5 GHz, a 100 ppm crystal offset corresponds to a frequency offset of 50 kHz. For a symbol period of T=3.2 µs, $\Delta fc$ T=1.6.

The synchronized signal after FFT is input to a channel estimator. The channel estimation is performed by inserting pilot tones into each OFDM symbol. Block type pilot channel estimation has been developed assuming a slow fading channel exists. Even with decision a feedback equalizer, this assumes that the channel transfer function does not change rapidly. The estimation of the channel for this block-type pilot arrangement can be based on Least Square (LS) or Minimum Mean-Square (MMSE). The MMSE estimate has been shown to give a 10-15 dB gain in signal-to-noise ratio (SNR) for the same mean square error of channel estimation over the LS estimate. The comb-type pilot channel estimation, has been introduced to satisfy the need for equalizing when the channel changes from even one OFDM block to the subsequent one. The comb-type pilot channel estimation consists of algorithms to estimate the channel at pilot frequencies and to interpolate the channel.

After processing by the digital processors 25 and 26, the OFDM signal is sent to the channel decoder and de-interleaver 27. In a DVB-T transmitter, the generation of the OFDM signal includes steps of transport multiplex adaptation and randomization for energy dispersal, outer coding and outer interleaving, inner coding, inner interleaving, and signal constellations and mapping. Thus, at the receiver end, in order to recover the OFDM signal, corresponding inverse steps must be implemented by the channel decoder and de-interleaver 27.

Finally, the data, such as MPEG-2 data, carried on the OFDM signal is derived.

The mode detector 24 will be described in the following.

The first processing step applied to the OFDM signal by the mode detector 24 is down-sampling. The aim of the down-sampling is to generate down-sampled version of each OFDM symbol containing only one sample in the guard interval and its counterpart in the rear portion of the desired part.

For example, if the target Tu=2048 (2K mode) and Tg=64 (RTg=1/32), then each OFDM symbol contains 2112 samples. Among them, the first 64 samples are the guard interval samples and the rest are the (desired) data samples. The first 64 samples are copies of the 64 data samples in the same OFDM symbol. If this original sample stream r(t) is down-sampled by a factor D=64, each down-sampled version of the OFDM symbol will now contain 33 samples, wherein the first sample is the guard interval sample and the last ($33^{rd}$) is its counterpart data sample.

It is assumed that the resulting down-sampled sample stream can be expressed as {y1(p)}, where p is an integer and represents the domain of the sampled stream. It is also assumed that the guard interval samples are located at p=33n. Thus, their counterparts will be located at p=33n+32, meaning that regardless of other interference, y(33n)=y(33n+32) for integer n. If the timing of the down-sampled stream is correct, an average result I1=|$\Sigma$b(n)|$^2$, where n=0,1, ... M−1, M is a predetermined value and b(n)=y1(33n)y1*(33n+32), will be a relatively large value since y1(33n+32) is the counterpart of y1(33n) and their match is a hit. On the other hand, if the timing of the down-sampled stream is wrong, as is the usual case, y1(33n−s) is not a counterpart, and does not correlate with y1(33n+32−s) for s<>0. Thus, the resulting indicator I1 approaches 0 since every match in this case is a miss.

If the target RTg is 1/16, then a time-domain OFDM symbol will contain 2176 samples, wherein the first 128 samples, which are the copies of the last 128 samples in the same OFDM symbol, belong to the guard interval, the rest belong to the desired part. If the data stream is down-sampled by a factor D=64, the down-sampled version of each OFDM symbol will now contain 34 samples, wherein the first 2 samples belong to the guard interval and their counterparts are the last two (the $33^{rd}$ and $34^{th}$) samples. If the timing of the down-sampled stream is correct, an indicator I2=|$\Sigma$b(n)|$^2$, where n=0,1, ... M−1, M is a predetermined value and b(n)=y1(34n) y1*(34n+32), will be a relatively large value; otherwise, it will approach 0, as previously explained. It is noted that the indicator I2 may also be derived by a sequence {y2(p)} derived by further down-sampling {y1(p)} by a factor of 2 (i.e., the original sample stream is down-sampled by a factor of 128) according to the following equation:

$$I2=|\Sigma b(n)|^2$$

where b(n)=y2(17n)y2*(17n+16).

Similarly, if the target RTg=1/8, the corresponding indicator I3 for this case is derived from the equations:

$$b(n)=y1(36n)y1*(36n+32)$$

$$I3=|\Sigma b(n)|^2, \text{ for } n=0,1,\ldots,M-1$$

or $$b(n)=y3(9n)y3*(9n+8)$$

$$I3=|\Sigma b(n)|^2, \text{ for } n=0,1,\ldots,M-1,$$

where {y3(p)} is a sequence derived by down-sampling r(t) by a factor of 256.

The indicator I3 will yield a relatively large value if the timing of the down-sampled stream is correct; otherwise, it will approach 0.

If the target RTg=1/4 and {y4(p)} is derived by down-sampling the original sequence by a factor of 512, the corresponding indicator I4 can be derived from:

$b(n)=y1(40n)y1^*(40n+32)$ $I4=|\Sigma b(n)|^2$, for $n=0,1,\ldots,M-1$ or $b(n)=y4(5n)y4^*(5n+4)$ $I4=|\Sigma b(n)|^2$, for $n=0,1,\ldots,M-1$ The indicator I4 will yield a relatively large value if the timing of the down-sampled stream is correct; otherwise, it will approach 0.

A first scenario in which a transmitter of DVB-T system adopts Tu=2K and RTg=1/32 is now presented for consideration. In this scenario the guard interval samples and their counterparts in the desired parts are located at p=33n and p=33n+32, for any integer n, in the down-sampled version {y1(p)}. The resulting indicator I1 will have a large value since every match is a hit. As for the indicator I2, one out of every 33 matches of y1(33n) and y1(34n+32) will be a hit since 33 and 34 are relatively prime. Thus, the indicator I2 will be much smaller than I2 but larger than 0. The situation is the same for the indicator I4 since 40 and 33 are also relatively prime. The situation for the indicator I3 is slightly different. 33 and 36 are not relatively prime (their greatest common divisor is 3). one out of every 11 matches of y1(36n) and y1(36n+32) will be a hit. Therefore, I3 is about three times larger than I2 or I4. In this scenario, since the indicator I1 is much larger than and distinguishable from the other three indicators, the target RTg can be easily identified by comparing the 4 indicators I1~I4.

In another scenario the Tu and RTg are the same as those in the above posed scenario, but the guard interval samples and their counterparts in {y1(p)} are now located at p=33n−1 and p=33n+31, respectively. In this case, the resulted I1 will be about 0 since the match $b(n)=y1(33n)y1^*(33n+32)$ is always a miss due to the fact that the timing is incorrect. As 33 is relatively prime to 34, the value of I2 will be about the same as that in the previous scenario. This can be easily proved by the following. An integer pair (k1, k2) can be found such that 33k1−1 equals 34k2. This means that, from time to time, the first element y1(34k2) for performing a match will be a guard interval sample, the second element y1(34k2+32) in the match operation will be its counterpart. In this case, this match is a hit. It can be easily shown that, among every 33 matches, one will be a hit. Therefore, the value of I2 will be about the same as that in the first scenario. Similarly, the value of I4 will be about the same as that in the first scenario. The indicator I3 is also 0 due to the fact that 33 and 36 are not relatively prime. No integer pair (k1, k2) can be found to make 33k1−1 equal to 36k2. Every match for deriving I3 is a miss since the timing is wrong. This is a frustrating situation since the indicators I1 and I3, both approaching 0, are too similar, and unable to identify the target RTg.

To solve this problem, an additional indicator I3b is used, which is derived from equations:

$b(n)=y1(36n-1)y1^*(36n+31)$, $I3b=|\Sigma b(n)|^2$, for $n=0,1,\ldots,M-1$.

Since an integer pair (k1, k2) which makes (33k1−1) equal to (36k2−1), one out of every 11 matches for deriving I3b is a hit. If the indicator I3 is renamed as I3a and the maximum of I3a and I3b is taken as I3, the target RTg is easily determined since I1 is smaller than I2, I3 and I4.

In the following, a third scenario is considered, in which the Tu and RTg are the same as those in the first scenario, but the guard interval samples and their counterparts in {y1(p)} are now located at p=33n−2 and p=33n+30, respectively. In this scenario, the value of the resulting I1 approach 0, and the values of the resulted I2 and I4 are about the same as those in the previous scenarios. However, another frustrating situation in which the indicator I3, the maximum of I3a and I3b, also approaches 0 since both of I3a and I3b approach 0. No integer pair (k1, k2) can be found to make 33k1−2 equal to 36k2 or 33k1−3 to 36k2−1. To solve this problem, an additional indicator I3c is used and I3 is the maximum of I3a, I3b and I3c. The indicator I3c is derived from equations:

$b(n)=y1(36n-2)y1^*(36n+30)$, $I3b=|\Sigma b(n)|^2$, for $n=0,1,\ldots,M-1$.

Thus, one out of every 11 matches is a hit. The target RTg is easily identified since I1 is the smallest among all the other indicators.

In a fourth scenario, the guard interval samples and their counterparts in {y1(p)} are now located at p=33n−3 and p=33n+29, respectively. The indicator I1 approaches 0, and both the indicator I3b and I3c approach 0. However, I3a does not approach 0 since not all the matches performed to derive it are misses. As a result, the target RTg can be determined by comparing the resulted I1, I2, I3 and I4.

From the previously described scenarios, it is concluded that when the guard interval sample is located at p=33n−3m, where m is an integer, all the resulting sub-indicators for I3 approach 0 except for I3a; when the guard interval sample is located at p=33n−3m−1, all the sub-indicators approach 0 except for I3b; all the sub-indicators approach 0 except for I3c when the guard interval sample is located at p=33n−3m−2.

If the transmitter adopts the 2K mode and RTg=1/16, the resulting I1 and I3 do not approach 0 under all timing conditions. I2 is a large value with correct match timing and about 0 with incorrect match timing. There seems to be a similar problem for I4 to those related to I1 and I3 discussed previously since the symbol period of I2 (34) and that of I4 (40) are not relatively prime. However, this is because the results are deduced from the domain of {y1(p)}. In fact, the problem can be clarified by the domain of {y2(p)}. From {y2(p)}, I2 and I4 can be derived respectively as $b(n)=y2(17n)y2^*(17n+16)$, $I2=|\Sigma b(n)|^2$, for $n=0,1,\ldots,M-1$.

and $b(n)=y2(20n)y2^*(20n+16)$, $I4=|\Sigma b(n)|^2$, for $n=0,1,\ldots,M-1$.

It is noted that the symbol periods 17 and 20 are relatively prime. This means that, in this scenario, one out of 17 matches for deriving I4 is a hit under all matched timing conditions. Therefore, no extra sub-indicator is necessary for I4.

Detection of the adopted RTg by the indicators will be explained in the following.

(1) If the value of the largest indicator is much larger than that of the second largest indicator, determine the RTg corresponding to this largest indicator as the adopted RTg;

(2) If the value of the smallest indicator approaches 0 and is much less than the second smallest indicator, determining the RTg corresponding to this smallest indicator as the adopted RTg.

Case (1) corresponds to the situation of correct match timing while case (2) corresponds to incorrect timing situations.

In the 8K mode, the situation is much the same, except that {y1(p)}, {y2(p)}, {y3(p)} and {y4(p)} are the down-sampled versions of the original sample stream by the factors of 256, 512, 1024 and 2048, respectively.

It should be noted that if the transmitter operates in the 2K mode, all the four indicators relative to 8K mode approach 0. Therefore, the average value of the four indicators relative to 2K mode is larger than that to 8K mode. On the contrary, the average value of the four indicators relative to 8K mode is larger than that of 2K mode if the transmitter operates in the 8K mode.

Figure 4:
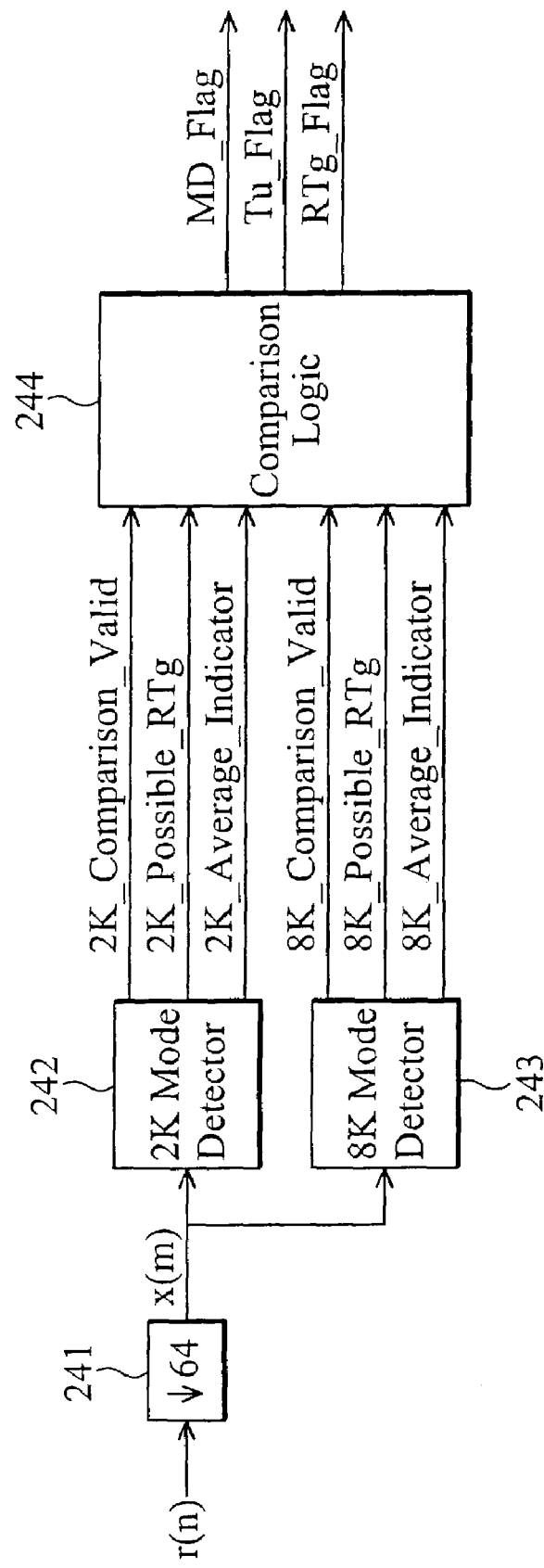
FIG. 4 is a diagram showing a mode detector in the DVB-T receiver according to one embodiment of the invention.

FIG. 4 is a diagram showing the mode detector 24. It receives the original sample sequence r(n) from the A/D converter 23, and comprises a down-sampling circuit 241, 2K sub mode detector 242, 8K sub mode detector 243 and comparison logic circuit 244. The down-sampling circuit 241 down-samples the original sequence r(n) by a factor of 64, and outputs the down-sampled sequence x(m) to the 2K and 8K sub mode detector 242 and 241. The 2K sub mode detector 242 generates data 2K_Comparison_Valid, 2K_Possible_RTg and 2K_Average_Indicator to the comparison logic circuit 244 according to the received sequence x(m). Similarly, the 8K sub mode detector 243 generates data 8K_Comparison_Valid, 8K_Possible_RTg and 8K_Average_Indicator to the comparison logic circuit 244 according to the received sequence x(m). Finally, the comparison logic circuit 244 determines the transmission mode, Tu and RTg output through the data MD_lag, Tu_Flag, and RTg_Flag by the following procedure:

```
{If 2K_Comparison_Valid=TRUE, 8K_Comparison_Valid=TRUE,
    MD_Flag=SUCCESS
    If 2K_Average_Indicator>8K_Average_Indicator
        Tu_Flag=2K
        RTg_Flag=2K_Possible_RTg
    Else
        Tu_Flag=8K
        RTg_Flag=8K_Possible_RTg
If 2K_Comparison_Valid=TRUE, 8K_Comparison_Valid=FALSE,
    MD_Flag=SUCCESS
    Tu_Flag=2K
    RTg_Flag=2K_Possible_RTg
If 2K_Comparison_Valid=FALSE, 8K_Comparison_Valid=TRUE,
    MD_Flag=SUCCESS
    Tu_Flag=8K
    RTg_Flag=8K_Possible_RTg
If 2K_Comparison_Valid=FALSE, 8K_Comparison_Valid=FALSE,
    MD_Flag=FAIL
```

It is noted that when MD_Flag=FAIL, the mode detector 24 fails to determine the value of Tu and RTg. This might occur when no DVB-T signal is transmitted.

Figure 5:
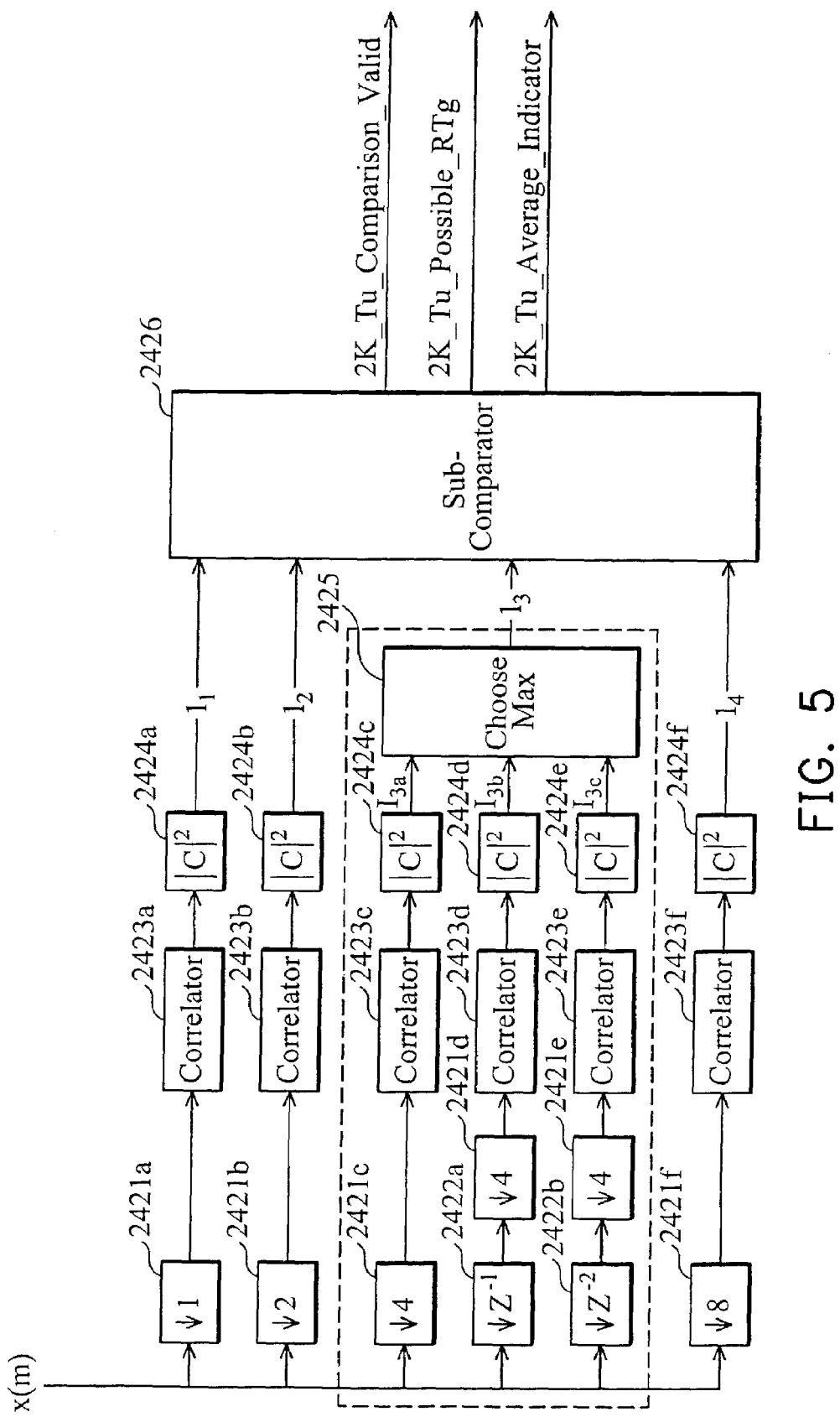
FIG. 5 is a diagram showing a 2K sub mode detector of the mode detector in the DVB-T receiver according to one embodiment of the invention.

FIG. 5 is a diagram showing the 2K sub mode detector 242. It includes six down-sampling circuits 2421a~2421f, two delay units 2422a and 2422b, six correlators 2423a~2423f, six power calculators 2424a~2424f, a maximum choosing circuit 2425 and a sub-comparator 2426.

The indicator I1 is derived by sequentially processing the sample stream x(m) by the down-sampling circuit 2421a, correlator 2423a and power calculator 2424a. The indicator I2 is derived by sequentially processing the sample stream x(m) by the down-sampling circuit 2421b, correlator 2423b and power calculator 2424b. The indicator I3a is derived by sequentially processing the sample stream x(m) by the down-sampling circuit 2421c, correlator 2423c and power calculator 2424c. The indicator I3b is derived by sequentially processing the sample stream x(m) by the delay unit 2422a, down-sampling circuit 2421d, correlator 2423d and power calculator 2424d. The indicator I3c is derived by sequentially processing the sample stream x(m) by the delay unit 2422b, down-sampling circuit 2421e, correlator 2423e and power calculator 2424e. The indicator I4 is derived by sequentially processing the sample stream x(m) by the down-sampling circuit 2421f, correlator 2423f and power calculator 2424f.

The down-sampling circuit 2421a-2421f down-sample the received stream respectively by factors of 1, 2, 4, 4, 4 and 8. The delay units 2422a and 2422b delay the received stream respectively by 1 and 2 samples. If y and c denote the input and output of the correlators 2423a~2423f, $c=\Sigma y(33n)y^*(33n+32)$ for the correlator 2423a, $c=\Sigma y(17n)y^*(17n+16)$ for the correlator 2423b, $c=\Sigma y(9n)y^*(9n+8)$ for the correlators 2423c~2423e and $c=\Sigma y(5n)y^*(5n+4)$ for the correlator 2423f, where n=0, 1, . . . , M−1, and M is a predetermined value. The power calculators 2424a~2424f calculation the power values $|c|^2$ of the output of the correlators 2423a~2423f.

The maximum choosing circuit 2425 selects the largest value of the group I3a, I3b and I3c as its output I3. The sub comparator 2426 receives the indicators I1~I4 to determine the value of 2K_Comparison_Valid, 2K_Possible_RTg and 2K_Average_Indicator by the following algorithm.

(a) sorting the indicators I1, I2, I3 and I4, and deriving a result {S1, S2, S3, S4}.

(b) Implementing the procedure:

```
{If S1>αS2
    2K_Tu_Comparison_Valid=TRUE
    2K_Tu_Possible_RTg=RTgS1
Elseif S3>βS4
    2K_Tu_Comparison_Valid=TRUE
    2K_Tu_Possible_RTg=RTgS4
Else
    2K_Tu_Comparison_Valid=FALSE},
``` wherein α and β are predetermined values and are both larger than 1, RTgS1 is ⅓₂, ⅟₁₆, ⅛ and ¼ if S1 is I1, I2, I3 and I4 respectively, and RTgS4 is ⅓₂, ⅟₁₆, ⅛ and ¼ if S4 is I1, I2, I3 and I4 respectively.

(c) 2K_Tu_Average_Indicator=I1+I2+I3+I4

Figure 6:
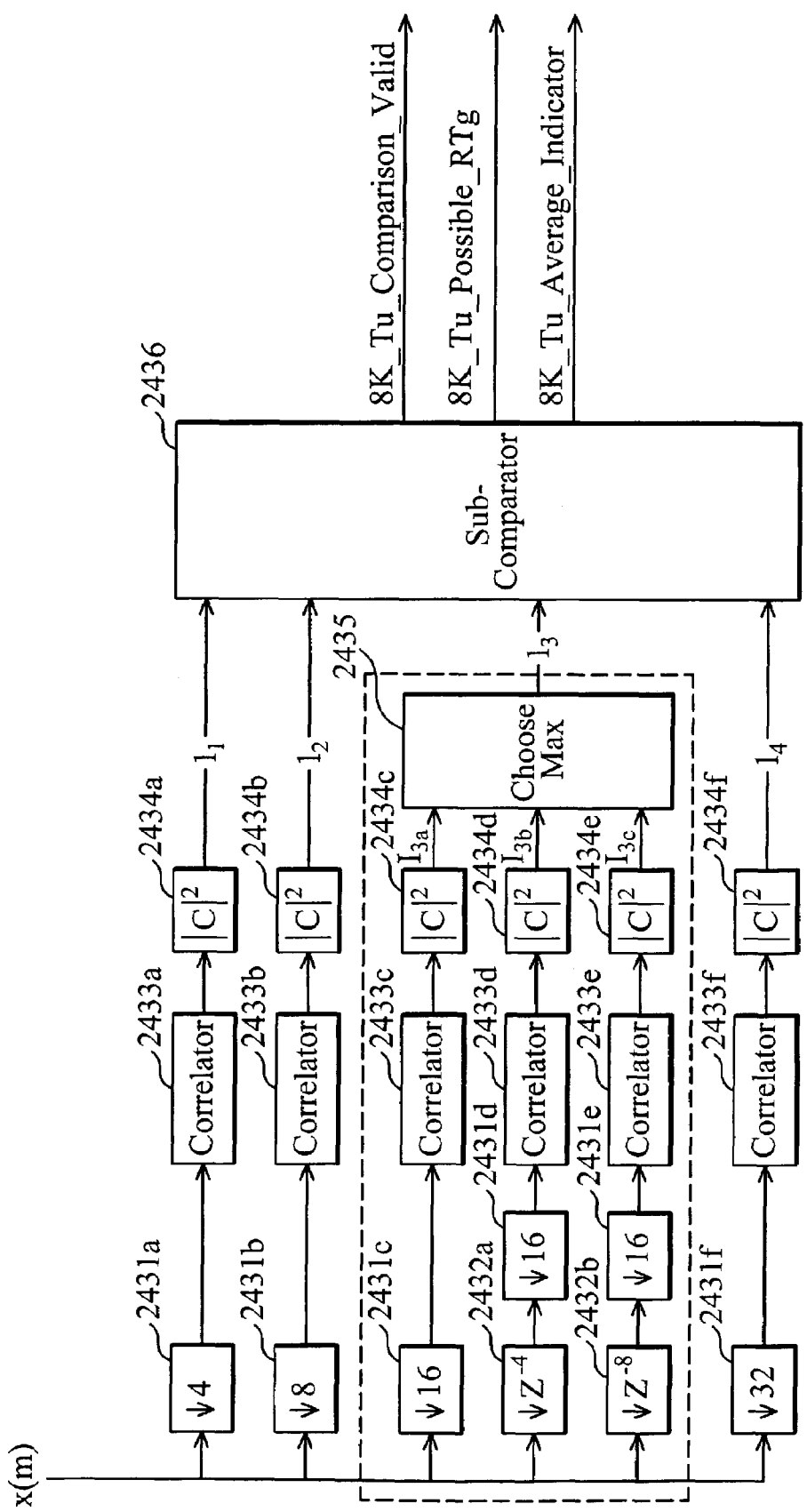
FIG. 6 is a diagram showing an 8K sub mode detector of the mode detector in the DVB-T receiver according to one embodiment of the invention.

FIG. 6 is a diagram showing the 8K sub mode detector 243. It includes six down-sampling circuits 2431a~2431f, two delay units 2432a and 2432b, six correlators 2433a~2433f, six power calculators 2434a~2434f, a maximum choosing circuit 2435 and a sub-comparator 2436. The indicator I1 is derived by sequentially processing the sample stream x(m) by the down-sampling circuit 2431a, correlator 2433a and power calculator 2434a. The indicator I2 is derived by sequentially processing the sample stream x(m) by the down-sampling circuit 2431b, correlator 2433b and power calculator 2434b. The indicator I3a is derived by sequentially processing the sample stream x(m) by the down-sampling circuit 2431c, correlator 2433c and power calculator 2434c. The indicator I3b is derived by sequentially processing the sample stream x(m) by the delay unit 2432a, down-sampling circuit 2431d, correlator 2433d and power calculator 2434d. The indicator I3c is derived by sequentially processing the sample stream x(m) by the delay unit 2432b, down-sampling circuit 2431e, correlator 2433e and power calculator 2434e. The indicator I4 is derived by sequentially processing the sample stream x(m) by the down-sampling circuit 2431f, correlator 2433f and power calculator 2434f.

The down-sampling circuit 2431a~2431f down-sample the received stream respectively by factors of 4, 8, 16, 16, 16 and 32. The delay units 2432a and 2432b delay the received stream respectively by 4 and 8 samples. If y and c denote the input and output of the correlators 2433a~2433f, c=Σy(33n) y*(33n+32) for the correlator 2433a, c=Σy(17n)y*(17n+16) for the correlator 2433b, c=Σy(9n)y*(9n+8) for the correlators 2433c~2433e and c=Σy(5n)y*(5n+4) for the correlator 2433f, where n=0, 1, . . . , M−1, and M is a predetermined value. The power calculators 2434a~2434f calculate the power values $|c|^2$ of the output of the correlators 2433a~2433f.

The maximum choosing circuit 2435 selects the largest one of the group I3a, I3b and I3c as its output I3. The sub comparator 2436 receives the indicators I1~I4 to determine the value of 8K_Comparison_Valid, 8K_Possible_RTg and 8K_Average_Indicator by the following algorithm.

(a) sorting the indicators I1, I2, I3 and I4, and deriving a result {S1, S2, S3, S4}.
(b) Implementing the procedure:

```
{If S1>αS2
    8K_Tu_Comparison_Valid=TRUE
    8K_Tu_Possible_RTg=RTgS1
Elseif S3>βS4
    8K_Tu_Comparison_Valid=TRUE
    8K_Tu_Possible_RTg=RTgS4
Else
    8K_Tu_Comparison_Valid=FALSE},
``` wherein α and β are predetermined values and are both larger than 1, RTgS1 is ⅟32, ⅟16, ⅛ and ¼ if S1 is I1, I2, I3 and I4 respectively, and RTgS4 is ⅟32, ⅟16, ⅛ and ¼ if S4 is I1, I2, I3 and I4 respectively.

(c) 8K_Tu_Average_Indicator=I1+I2+I3+I4

In conclusion, the present invention provides a method and apparatus for detecting the transmitted mode and guard interval length, which are adopted by the DVB-T system to increase system flexibility and combat the multi-path interference in transmission environments, of the received OFDM signals by applying the concepts of down-sampling and correlation. The unique combination of down-sampling and correlation method requires far less memory than the traditional correlation methods. By comparing the indicators resulted from output of each correlation module, the transmitted mode and guard interval length are detected with much greater reliability.

The foregoing description of the preferred embodiments of this invention has been presented for purposes of illustration and description. Obvious modifications or variations are possible in light of the above teaching. The embodiments were chosen and described to provide the best illustration of the principles of this invention and its practical application to thereby enable those skilled in the art to utilize the invention in various embodiments and with various modifications as are suited to the particular use contemplated. All such modifications and variations are within the scope of the present invention as determined by the appended claims when interpreted in accordance with the breadth to which they are fairly, legally, and equitably entitled.

What is claimed is:

1. A method for processing a RF OFDM signal transmitted from an OFDM transmitter, comprising the steps of:
   receiving and converting the RF OFDM signal into an IF OFDM signal;
   converting the IF OFDM signal into a digital OFDM signal composed of an original sample sequence;
   detecting a transmission mode and guard interval length of the OFDM signal, comprising steps of:
      down-sampling the original sample sequence by a first, second, third and fourth factors to generate a first, second, third and fourth down-sampled sequence;
      delaying the original sample sequence by a first and second number of samples, and down-sampling the delayed sample sequences by the third factor to generate a fifth and sixth down-sampled sequence;
      applying a first, second and third correlation function to the first, second and fourth down-sampled sequence, and a fourth correlation function to the third, fifth and sixth down-sampled sequence, to derive a first, second, third, fourth, fifth and sixth correlation powers respectively;
      down-sampling the original sample sequence by a fifth, sixth, seventh and eighth factor to generate a seventh, eighth, ninth and tenth down-sampled sequence;
      delaying the original sample sequence by a third and fourth number of samples, and down-sampling the delayed sample sequences by the seventh factor to generate an eleventh and twelfth down-sampled sequence;
      applying the first, second and third correlation function to the seventh, eighth and ninth down-sampled sequence, and the fourth correlation function, to the tenth, eleventh and twelfth down-sampled sequence, to derive seventh, eighth, ninth, tenth, eleventh and twelfth correlation powers respectively; and
      determining the transmission mode and guard interval length by the first, second, third, seventh, eighth and ninth correlation powers, the maximum of the fourth, fifth and sixth correlation powers, and the maximum of the tent, eleventh and twelfth correlation powers;
   implementing digital processing of the OFDM signal in time domain and frequency domain; and
   implementing channel decoding and de-interleaving of the OFDM signal.

2. The method as claimed in claim 1, wherein the first, second, third, fourth, fifth, sixth, seventh and eighth factors are 64, 128, 256, 512, 256, 512, 1024 and 2048 respectively.

3. The method as claimed in claim 1, wherein the first, second, third and fourth numbers are 1, 2, 4 and 8.

4. The method as claimed in claim 1, wherein the first, second, third and fourth correlation functions are respectively c=Σy(33n)y*(33n+32), c=Σy(17n)y*(17n+16), c=Σy(9n)y* (9n+8) and c=Σy(5n)y*(5n+4) where c and y are the output and input of the correlation functions, and n=0, 1, . . . , M−1, and M is a predetermined value.

5. The method as claimed in claim 4, wherein the correlation powers are $|c|^2$.

6. The method as claimed in claim 1, wherein the first, second, third, seventh, eighth and ninth correlation powers, the maximum of the fourth, fifth and sixth correlation powers, and the maximum of the tenth, eleventh and twelfth correlation powers are respectively represented by indicators I1, I2, I3, I4, I5, I6, I7 and I8, and the transmission mode and guard interval length is determined by the steps of:

(a) sorting the indicators I1, I2, I3 and I4, and deriving a result {S1, S2, S3, S4};

(b) Implementing the procedure:

```
{If S1>αS2
    2K_Tu_Comparison_Valid=TRUE
    2K_Tu_Possible_RTg=RTgS1
Elseif S3>βS4
    2K_Tu_Comparison_Valid=TRUE
    2K_Tu_Possible_RTg=RTgS4
Else
    Tu_Comparison_Valid=FALSE
    2K_Tu_Average_Indicator=I1+I2+I3+I4},
``` wherein α and β are predetermined values and are both larger than 1, RTgS1 is 1/32, 1/16, 1/8 and 1/4 if S1 is I1, I2, I3 and I4 respectively, and RTgS4 is 1/32, 1/16, 1/8 and 1/4 if S4 is I1, I2, I3 and I4 respectively;

(c) sorting the indicators I5, I6, I7 and I8, and deriving a result {S5, S6, S7, S8};

(d) Implementing the procedure:

```
{If S5>αS6
    8K_Tu_Comparison_Valid=TRUE
    8K_Tu_Possible_RTg=RTgS5
Elseif S7>βS8
    8K_Tu_Comparison_Valid=TRUE
    8K_Tu_Possible_RTg=RTgS8
Else
    Tu_Comparison_Valid=FALSE
    8K_Tu_Average_Indicator=I5+I6+I7+I8},
``` wherein α and β are predetermined values and are both larger than 1, RTgS5 is 1/32, 1/16, 1/8 and 1/4 if S5 is I5, I6, I7 and I8 respectively, and RTgS8 is 1/32, 1/16, 1/8 and 1/4 if S8 is I5, I6, I7 and I8 respectively; and (e) implementing the procedure:

```
{If 2K_Comparison_Valid=TRUE and
    8K_Comparison_Valid=TRUE,
        MD_Flag=SUCCESS
    If 2K_Average_Indicator>8K_Average_Indicator
        Tu_Flag=2K
            RTg_Flag=2K_Possible_RTg
        Else
            Tu_Flag=8K
            RTg_Flag=8K_Possible_RTg
If 2K_Comparison_Valid= TRUE and 8K_Comparison_Valid=
    FALSE,
    MD_Flag=SUCCESS
    Tu_Flag=2K
    RTg_Flag=2K_Possible_RTg
If 2K_Comparison_Valid= FALSE and 8K_Comparison_Valid=
    TRUE,
    MD_Flag=SUCCESS
    Tu_Flag=8K
    RTg_Flag=8K_Possible_RTg
If 2K_Comparison_Valid= FALSE and 8K_Comparison_Valid=
    FALSE,
    MD_Flag=FAIL},
``` wherein $Tu_{13}$ Flag is the transmission mode, the product of $RTg_{\_Flag}$ and $Tu_{\_}$Flag is the guard interval length and MD_Flag indicates the success or failure of the mode detection.

7. A method of mode detection for an OFDM signal comprising the steps of:
  down-sampling the original sample sequence by a first, second, third and fourth factors to generate a first, second, third and fourth down-sampled sequence;
  delaying the original sample sequence by a first and second number of samples, and down-sampling the delayed sample sequences by the third factor to generate a fifth and sixth down-sampled sequence;
  applying a first, second, and third correlation function to the first, second and fourth down-sampled sequence, and a fourth correlation function to the third, fifth and sixth down-sampled sequence, to derive first, second, third, fourth, fifth and sixth correlation powers respectively;
  down-sampling the original sample sequence by a fifth, sixth, seventh and eighth factor to generate a seventh, eighth, ninth and tenth down-sampled sequence;
  delaying the original sample sequence by a third and fourth number of samples, and down-sampling the delayed sample sequences by the seventh factor to generate a eleventh and twelfth down-sampled sequence;
  applying the first, second and third correlation function to the seventh, eighth and ninth down-sampled sequence, and the fourth correlation function to the tenth, eleventh and twelfth down-sampled sequence, to derive seventh, eighth, ninth, tenth, eleventh and twelfth correlation powers respectively; and
  determining the transmission mode and guard interval length by the first, second, third, seventh, eighth and ninth correlation powers, the maximum of the fourth, fifth and sixth correlation powers, and the maximum of the tenth, eleventh and twelfth correlation powers.

8. The method as claimed in claim 7, wherein the first, second, third, fourth, fifth, sixth, seventh and eighth factors are 64, 128, 256, 512, 256, 512, 1024 and 2048 respectively.

9. The method as claimed in claim 7, wherein the first, second, third and fourth number are 1, 2, 4 and 8.

10. The method as claimed in claim 7, wherein the first, second, third and fourth correlation functions are respectively $c=\Sigma y(33n)y*(33n+32)$, $c=\Sigma y(17n)y*(17n+16)$, $c=\Sigma y(9n)y*(9n+8)$ and $c=\Sigma y(5n)y*(5n+4)$ where c and y are the output and input of the correlation functions, and n=0, 1, . . . , M−1, and M is a predetermined value.

11. The method as claimed in claim 10, wherein the correlation powers are $|c|^2$.

12. The method as claimed in claim 7, wherein the first, second, third, seventh, eighth and ninth correlation powers, the maximum of the fourth, fifth and sixth correlation powers, and the maximum of the tenth, eleventh and twelfth correlation powers are respectively represented by indicators I1, I2, I3, I4, I5, I6, I7 and I8, and the transmission mode and guard interval length is determined by the steps of:
  (a) sorting the indicators I1, I2, I3 and I4, and deriving a result {S1, S2, S3, S4};
  (b) Implementing the procedure:

```
{If S1>αS2
    2K_Tu_Comparison_Valid=TRUE
    2K_Tu_Possible_RTg=RTgS1
Elseif S3>βS4
    2K_Tu_Comparison_Valid=TRUE
    2K_Tu_Possible_RTg=RTgS4
Else
    Tu_Comparison_Valid=FALSE
    2K_Tu_Average_Indicator=I1+I2+I3+I4},
``` wherein α and β we predetermined values and are both larger than 1, RTgS1 is 1/32, 1/16, 1/8 and 1/4 if S1 is I1, I2, I3 and I4 respectively, and RTgS4 is 1/32, 1/16, 1/8 and 1/4 if S4 is I1, I2, I3 and I4 respectively;

(c) sorting the indicators I5, I6, I7 and I8, and deriving a result {S5, S6, S7, S8};

(d) Implementing the procedure:

```
{If S5>αS6
    8K_Tu_Comparison_Valid=TRUE
    8K_Tu_Possible_RTg=RTgS5
Elseif S7>βS8
    8K_Tu_Comparison_Valid=TRUE
    8K_Tu_Possible_RTg=RTgS8
Else
    Tu_Comparison_Valid=FALSE
8K_Tu_Average_Indicator=I5+I6+I7+I8},
``` wherein α and β are predetermined values and are both larger than 1, RTgS5 is 1/32, 1/16, 1/8 and 1/4 if S8 is I5, I6, I7 and I8 respectively, and RTgS8 is 1/32, 1/16, 1/8 and 1/4 if S8 is I5, I6, I7 and I8 respectively; and (e) implementing the procedure:

```
{If 2K_Comparison_Valid=TRUE and
    8K_Comparison_Valid=TRUE,
        MD_Flag=SUCCESS
    If 2K_Average_Indicator>8K_Average_Indicator
        Tu_Flag=2K
        RTg_Flag=2K_Possible_RTg
    Else
        Tu_Flag=8K
        RTg_Flag=8K_Possible_RTg
If 2K_Comparison_Valid= TRUE and 8K_Comparison_Valid=
    FALSE,
    MD_Flag=SUCCESS
    Tu_Flag=2K
    RTg_Flag=2K_Possible_RTg
If 2K_Comparison_Valid= FALSE and 8K_Comparison_Valid=
    TRUE,
    MD_Flag=SUCCESS
    Tu_Flag=8K
    RTg_Flag=8K_Possible_RTg
If 2K_Comparison_Valid= FALSE and 8K_Comparison_Valid=
    FALSE,
    MD_Flag=FAIL},
``` wherein Tu_Flag is the transmission mode, the product of RTg_Flag and Tu_Flag is the guard interval length and MD_Flag indicates the success or failure of the mode detection.

13. An OFDM receiver comprising:

a front end receiving and converting the RF QFDM signal into an IF OFDM signal;

an A/D converter converting the IF OFDM signal into a digital OFDM signal;

a mode detector detecting a transmission mode and guard interval length of the digital OFDM signal by the steps of:

down-sampling the original sample sequence by first, second, third and fourth factors to generate a first, second, third and fourth down-sampled sequence;

delaying the original sample sequence by a first and second number of samples, and down-sampling the delayed sample sequences by the third factor to generate a fifth and sixth down-sampled sequence;

applying a first, second and third correlation function to the first, second and fourth down-sampled sequence, and a fourth correlation function to the third, fifth and sixth down-sampled sequence, to derive first, second, third, fourth, fifth and sixth correlation powers respectively;

down-sampling the original sample sequence by a fifth, sixth, seventh and eighth factor to generate a seventh, eighth, ninth and tenth down-sampled sequence;

delaying the original sample sequence by a third and fourth number of samples, and down-sampling the delayed sample sequences by the seventh factor to generate an eleventh and twelfth down-sampled sequence;

applying the first, second and third correlation function to the seventh, eighth and ninth down-sampled sequence, and the fourth correlation function to the tenth, eleventh and twelfth down-sampled sequence, to derive seventh, eighth, ninth, tenth, eleventh and twelfth correlation powers respectively; and determining the transmission mode and guard interval length by the first second, third, seventh, eighth and ninth correlation powers, the maximum of the fourth, fifth and sixth correlation powers, and the maximum of the tenth, eleventh and twelfth correlation powers;

frequency and time domain digital processors implementing digital processing of the OFDM signal in time domain and frequency domain; and a channel decoder and de-interleaver implementing channel decoding and de-interleaving of the OFDM signal.

14. The OFDM receiver as claimed in claim 13, wherein the first, second, third, fourth, fifth, sixth, seventh and eighth factors are 64, 128, 256, 512, 256, 512, 1024 and 2048 respectively.

15. The OFDM receiver as claimed in claim 13, wherein the first second, third and fourth numbers are 1,2,4 and 8.

16. The OFDM receiver as claimed in claim 13, wherein the first, second, third and fourth correlation functions are respectively $c=\Sigma y(33n)y^*(33n+32)$, $c=\Sigma y(17n)y^*(17n+16)$, $c=\Sigma y(9n)y^*(9n+8)$ and $c=\Sigma y(5n)y^*(5n+4)$ where c and y are the output and input of the correlation functions, and n=0, 1, . . . , M−1, and M is a predetermined value.

17. The OFDM receiver as claimed in claim 16, wherein the correlation powers are $|c|^2$.

18. The OFDM receiver as claimed in claim 16, wherein the first, second, third, seventh, eighth and ninth correlation powers, the maximum of the fourth, fifth and sixth correlation powers, and the maximum of the tenth, eleventh and twelfth correlation powers are respectively represented by indicators I1, I2, I3, I4, I5, I6, I7 and I8, and the transmission mode and guard interval length is determined by the steps of:

(a) sorting the indicators I1, I2, I3 and I4, and deriving a result {S1, S2, S3, S4};

(b) Implementing the procedure:

```
{If S1>αS2
    2K_Tu_Comparison_Valid=TRUE
    2K_Tu_Possible_RTg=RTgS1
Elseif S3>βS4
    2K_Tu_Comparison_Valid=TRUE
    2K_Tu_Possible_RTg=RTgS4
Else
    Tu_Comparison_Valid=FALSE
2K_Tu_Average_Indicator=I1+I2+I3+I4},
``` wherein α and β are predetermined values and are both larger than 1, RTgS1 is 1/32, 1/16, 1/8 and 1/4 if S1 is I1, I2, I3 and I4 respectively, and RTgS4 is 1/32, 1/16, 1/8 and 1/4 if S4 is I1, I2, I3 and I4 respectively;

(c) sorting the indicators I5, I6, I7 and I8, and deriving a result {S5, S6, S7, S8};

(d) Implementing the procedure:

```
{If S5>αS6
    8K_Tu_Comparison_Valid=TRUE
    8K_Tu_Possible_RTg=RTgS5
Elseif S7>βS8
    8K_Tu_Comparison_Valid=TRUE
    8K_Tu_Possible_RTg=RTgS8
Else
    Tu_Comparison_Valid=FALSE
    8K_Tu_Average_Indicator=I5+I6+I7+I8},
``` wherein α and β are predetermined values and are both larger than 1, RTgS5 is 1/32, 1/16, 1/8 and 1/4 if S5 is I5, I6, I7 and I8 respectively, and RTgS8 is 1/32, 1/16, 1/8 and 1/4 if S8 is I5, I6, I7 and I8 respectively; and (e) implementing the procedure:

```
{If 2K_Comparison_Valid=TRUE and
    8K_Comparison_Valid=TRUE,
    MD_Flag=SUCCESS
If 2K_Average_Indicator>8K_Average_Indicator
    Tu_Flag=2K
    RTg_Flag=2K_Possible_RTg
Else
    Tu_Flag=8K
    RTg_Flag=8K_Possible_RTg
If 2K_Comparison_Valid= TRUE and 8K_Comparison_Valid=
    FALSE,
    MD_Flag=SUCCESS
    Tu_Flag=2K
    RTg_Flag=2K_Possible_RTg
If 2K_Comparison_Valid= FALSE and 8K_Comparison_Valid=
    TRUE,
    MD_Flag=SUCCESS
    Tu_Flag=8K
    RTg_Flag=8K_Possible_RTg
If 2K_Comparison_Valid= FALSE and 8K_Comparison_Valid=
    FALSE,
    MD_Flag=FAIL},
``` wherein Tu_Flag is the transmission mode, the product of RTg_Flag and Tu_Flag is the guard interval length and MD_Flag indicates the success or failure of the mode detection.

19. A mode detector detecting a transmission mode and guard interval length of the digital OFDM signal by the steps of:

down-sampling the original sample sequence by first, second, third and fourth factors to generate a first, second, third and fourth down-sampled sequence;

delaying the original sample sequence by a first and second number of samples, and down-sampling the delayed sample sequences by the third factor to generate a fifth and sixth down-sampled sequence;

applying a first, second and third correlation function to the first, second and fourth down-sampled sequence, and a fourth correlation function to the third, fifth and sixth down-sampled sequence, to derive first, second, third, fourth, fifth and sixth correlation powers respectively;

down-sampling the original sample sequence by a fifth, sixth, seventh and eighth factor to generate a seventh, eighth, ninth and tenth down-sampled sequence;

delaying the original sample sequence by a third and fourth number of samples, and down-sampling the delayed sample sequences by the seventh factor to generate an eleventh and twelfth down-sampled sequence;

applying the first, second and third correlation function to the seventh, eighth and ninth down-sampled sequence, and the fourth correlation function to the tenth, eleventh and twelfth down-sampled sequence, to derive seventh, eighth, ninth, tenth, eleventh and twelfth correlation powers respectively; and determining the transmission mode and guard interval length by the first, second, third, seventh, eighth and ninth correlation powers, the maximum of the fourth, fifth and sixth correlation powers, and the maximum of the tenth, eleventh and twelfth correlation powers.

20. The mode detector as claimed in claim 19, wherein the first, second, third, fourth, fifth, sixth, seventh and eighth factors are 64, 128, 256, 512, 256, 512, 1024 and 2048 respectively.

21. The mode detector as claimed in claim 19, wherein the first, second, third and fourth number are 1, 2, 4 and 8.

22. The mode detector as claimed in claim 19, wherein the first, second, third and fourth correlation functions are respectively $c=\Sigma y(33n)y^*(33n+32)$, $c=\Sigma y(17n)y^*(17n+16)$, $c=\Sigma y(9n)y^*(9n+8)$ and $c=\Sigma y(5n)y^*(5n+4)$ where c and y are the output and input of the correlation functions, and $n=0, 1, \ldots, M-1$, and M is a predetermined value.

23. The mode detector as claimed in claim 22, wherein the correlation powers are $|c|^2$.

24. The mode detector as claimed in claim 19, wherein the first, second, third, seventh, eighth and ninth correlation powers, the maximum of the fourth, fifth and sixth correlation powers, and the maximum of the tenth, eleventh and twelfth correlation powers are respectively represented by indicators I1, I2, I3, I4, I5, I6, I7 and I8, and the transmission mode and guard interval length is determined by the steps of:

(a) sorting the indicators I1, I2, I3 and I4, and deriving a result {S1, S2, S3, S4};

(b) Implementing the procedure:

```
{If S1>αS2
    2K_Tu_Comparison_Valid=TRUE
    2K_Tu_Possible_RTg=RTgS1
Elseif S3>βS4
    2K_Tu_Comparison_Valid=TRUE
    2K_Tu_Possible_RTg=RTgS4
Else
    Tu_Comparison_Valid=FALSE
    2K_Tu_Average_Indicator=I1+I2+I3+I4},
``` wherein α and β are predetermined values and are both larger than 1, RTgS1 is 1/32, 1/16, 1/8 and 1/4 if S1 is I1, I2, I3 and I4 respectively, and RTgS4 is 1/32, 1/16, 1/8 and 1/4 if S4 is I1, I2, I3 and I4 respectively;

(c) sorting the indicators I5, I6, I7 and I8, and deriving a result {S5, S6, S7, S8};

(d) Implementing the procedure:

```
{If S5>αS6
    8K_Tu_Comparison_Valid=TRUE
    8K_Tu_Possible_RTg=RTgS5
Elseif S7>βS8
    8K_Tu_Comparison_Valid=TRUE
    8K_Tu_Possible_RTg=RTgS8
```

```
        Else
            Tu_Comparison_Valid=FALSE
        8K_Tu_Average_Indicator=I5+I6+I7+I8},
``` wherein α and β are predetermined values and are both larger than 1, RTgS5 is 1/32, 1/16, 1/8 and 1/4 if S5 is I5, I6, I7 and I8 respectively, and RTgS8 is 1/32, 1/16, 1/8 and 1/4 if S8 is I5, I6, I7 and I8 respectively; and (e) implementing the procedure:

```
{If 2K_Comparison_Valid=TRUE and
    8K_Comparison_Valid=TRUE,
    MD_Flag=SUCCESS
    If 2K_Average_Indicator>8K_Average_Indicator
        Tu_Flag=2K
        RTg_Flag=2K_Possible_RTg
    Else
        Tu_Flag=8K
        RTg_Flag=8K_Possible_RTg
If 2K_Comparison_Valid= TRUE and 8K_Comparison_Valid=
    FALSE,
    MD_Flag=SUCCESS
    Tu_Flag=2K
    RTg_Flag=2K_Possible_RTg
If 2K_Comparison_Valid= FALSE and 8K_Comparison_Valid=
    TRUE,
    MD_Flag=SUCCESS
    Tu_Flag=8K
    RTg_Flag=8K_Possible_RTg
If 2K_Comparison_Valid= FALSE and 8K_Comparison_Valid=
    FALSE,
    MD_Flag=FAIL},
``` wherein Tu_Flag is the transmission mode, the product of RTg_Flag and Tu_Flag is the guard interval length and MD_Flag indicates the success or failure of the mode detection.

\* \* \* \* \*